United States Patent
Sternberg

(10) Patent No.: US 6,765,154 B2
(45) Date of Patent: Jul. 20, 2004

(54) PORTABLE, ADJUSTABLE BED WEIGHING SYSTEM

(75) Inventor: Louis Sternberg, Mill Creek, WA (US)

(73) Assignee: Louis E. Sternberg, Mill Creek, WA (US)

( * ) Notice: Subject to any disclaimer, the term of this patent is extended or adjusted under 35 U.S.C. 154(b) by 45 days.

(21) Appl. No.: 10/024,987

(22) Filed: Dec. 18, 2001

(65) Prior Publication Data

US 2003/0111275 A1 Jun. 19, 2003

(51) Int. Cl.$^7$ .............................................. G01G 19/00
(52) U.S. Cl. .................... 177/126; 177/144; 177/199; 177/200
(58) Field of Search .............................. 177/126, 127, 177/144, 229, 199, 200

(56) References Cited

U.S. PATENT DOCUMENTS

| | | | | |
|---|---|---|---|---|
| 3,732,938 A | * | 5/1973 | Nelson | 177/126 |
| 3,961,675 A | * | 6/1976 | Siegel | 177/126 |
| 4,281,730 A | | 8/1981 | Swersey et al. | 177/144 |
| 4,711,313 A | * | 12/1987 | Iida et al. | 177/126 |
| 4,880,069 A | * | 11/1989 | Bradley | 177/229 |
| 4,886,133 A | * | 12/1989 | Horn et al. | 177/229 |
| 5,269,388 A | | 12/1993 | Reichow et al. | 177/144 |
| 5,414,225 A | * | 5/1995 | Garfinkle | 177/199 |

* cited by examiner

Primary Examiner—Randy W. Gibson
(74) Attorney, Agent, or Firm—Garrison & Associates PS; David L. Garrison

(57) ABSTRACT

A portable weighing system for a bed comprising a pair of scales placed under the legs or support members of a bed and a weight data collector unit. The scales are positioned directly below the ends of a bed and resting on the floor, and the legs or support members of the bed are then placed on the scales. Each scale is comprised of a beam shaped load cell, support bar, and support bar extensions. The load cell is shaped such that a section of the load cell rests on a horizontally disposed floor engaging base and the ends of the load cell are elevated above the base such that the ends do not rest on the base. The support bar is positioned above said load cell and attached to said load cell by a pair of threaded fasteners. The two support bar extensions are adjustably attached to each end of the support bar such that the width of said scale can be readily adjusted to accommodate beds of varying widths.

11 Claims, 4 Drawing Sheets

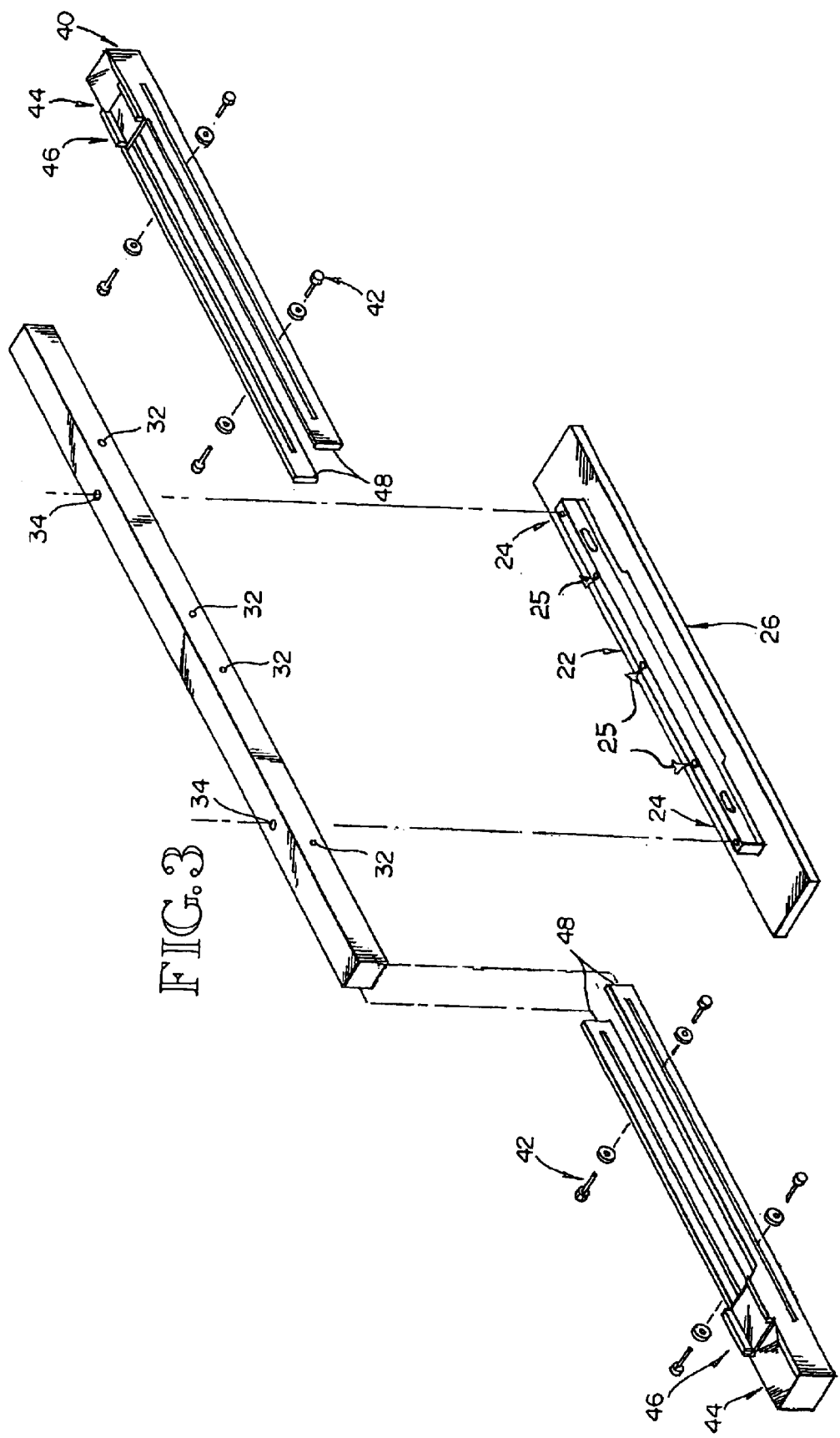

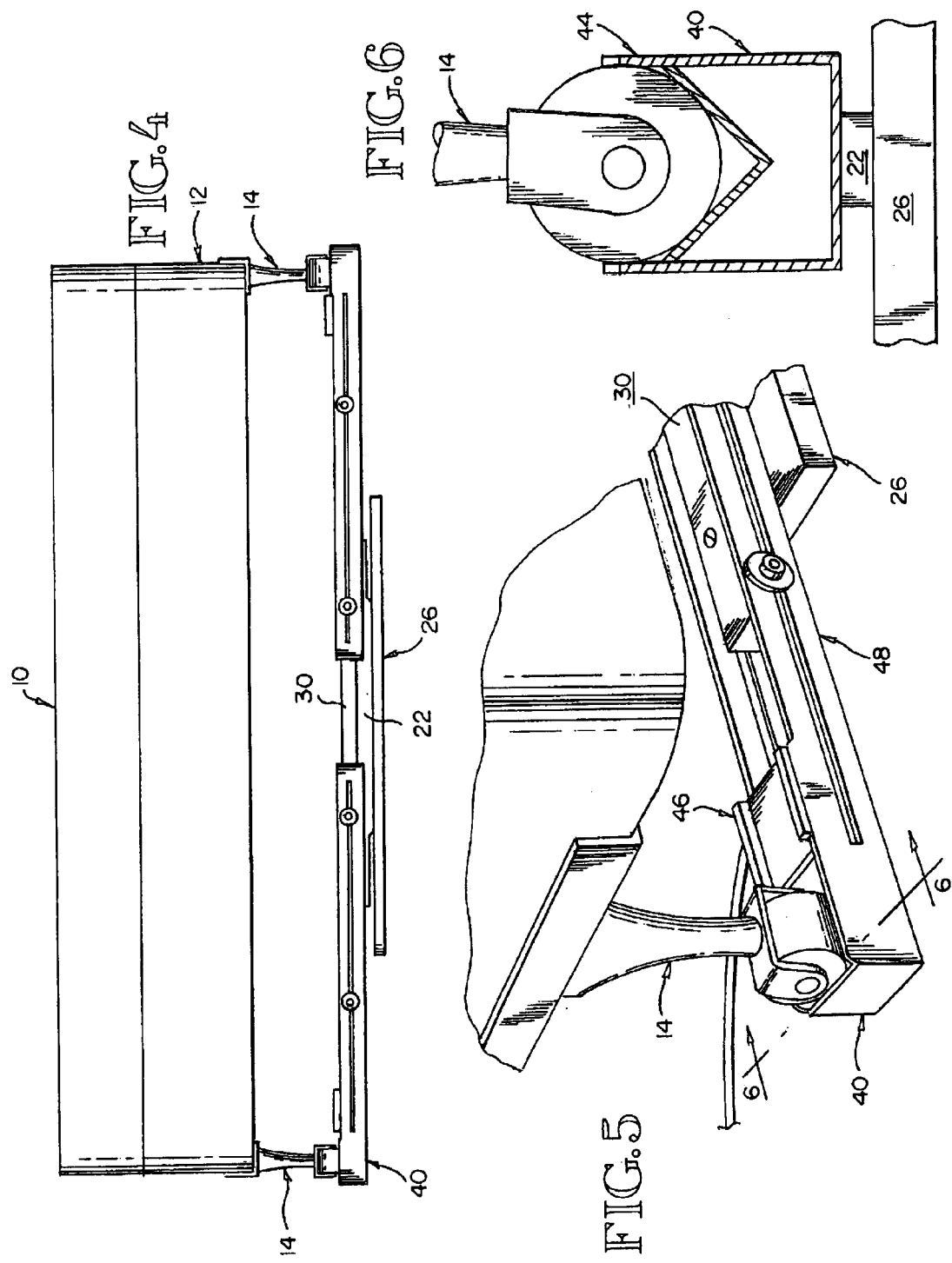

PORTABLE, ADJUSTABLE BED WEIGHING SYSTEM

FIELD OF INVENTION

This invention relates to a weighing system that is used by placing a pair of scales under the legs or wheels of an object such as a bed, chair, chaise lounge, sofa or the like. The weighing system has improved accuracy and stability over other such systems and may be used to determine the weight of patients in a plurality of types of hospital beds, nursing home beds, chairs, or for home use.

BACKGROUND OF THE INVENTION

It is frequently desirable to accurately monitor the weight of a patient confined to a bed, chair, etc., whether in a hospital, in a nursing home, at home, or in other treatment settings, and to observe changes in weight to monitor the health of the patient and ensure that proper dosages of medication are administered. It is difficult, however, to weigh seriously ill patients or persons with limited mobility by removing them from the bed on a regular basis. Critically ill patients, in particular, may require frequent weighing, with their severe physical condition preventing their removal from bed.

The current method of determining the weight of a patient in a hospital or nursing home bed is both time consuming and onerous. Additionally it involves some risk of danger both to the patient (possible spills, etc.) as well as the caregivers (back strain, etc.).

Typically two trained persons are needed to accomplish this task. Most often they will utilize a patient lift (or hoist) that has an attached scale. First, the patient is placed into a sling and harness assembly and then the sling is attached to the hoist, which has been centered above the bed. Utilizing the hoist, the patient is then raised approximately 12 inches above the bed so that his or her legs float free. The patient's weight is then recorded and the patient is lowered back into the bed. An alternative to the above method is to simply bring a wheelchair to the bedside, transfer the patient from the bed to the wheelchair, and then wheel the chair to an appropriate scale. Unfortunately, the alternative is seldom possible. Patients in hospitals or nursing care facilities are there by Doctor's orders. They are there because of the high level of care they need. They are seldom able or physically ready to transfer out of their bed to a wheelchair. They are typically disabled and often fragile following surgery. They may, and often do, become distressed when being transferred out of bed just to get their weight recorded.

Therefore, it is desirable to have a weigh system that is not time consuming for the caregiver, does not require two persons, and does not pose a risk or danger to either the patient or the caregiver.

Beds incorporating weighing systems, such that the patient need not be removed from the bed to be weighed, have been disclosed. For example, in Reichow et al. U.S. Pat. No. 5,269,388 and Carruth et al., U.S. Pat. No. 4,926, 951. The system disclosed in Reichow et al. utilizes load cells, which are rigidly mounted along the sides of the bed frame. The Carruth system utilizes a separate weigh frame mounted to the bed frame. These systems are generally an integral part of the bed, and must be incorporated into the bed when it is manufactured. Beds incorporating these weighing systems are generally more expensive than ordinary beds without a weighing system, are typically permanently attached, and are also much heavier, making it more difficult to move such beds.

Therefore, it is desirable to have a weigh system that is not permanently attached to a hospital bed or nursing home bed, since it is necessary in such systems to have a complete system for each bed. In facilities having many beds, the cost of separate weigh facilities for each bed is substantial. Particularly in nursing home and extended care facilities it is frequently not necessary to check a patient's weight every day, and having a portable system which may easily be used on various beds in the care facility at various times would be a substantial cost savings. In many installations, a single set of weighing devices may suffice for the entire facility.

U.S. Pat. No. 4,281,730, issued to Swersey et al, discloses the use of a portable under bed scale that can be used in pairs to determine the weight of a person in the bed. The invention disclosed in the Swersey patent determines the weight of a patient by measuring the displacement at the end of a pair of beams that are pivotally mounted to each scale. Springs are provided to return the beam ends to a non-displaced position after the weight has been removed.

The scale disclosed in the Swersey Patent, while portable still has several drawbacks. The Swersey Patent teaches that the maximum patient weight that can be accommodated is 150 kilograms (about 330 pounds) and the scale requires leveling. The Swersey Patent teaches the use of additional springs to provide accuracy and to reduce hysteresis, however hysteresis will still occur and the scale will have to be re-calibrated.

The Swersey Patent teaches that when a load is in place on the scales, the springs are under tension, and the beams "float." This could potentially cause stability problems if a patient is not centered on the surface of the bed. If a patient suddenly moves, or is lying to one side of the bed, the bed could possibly tilt. Unfortunately, even a minor tilt of a hospital or nursing home bed could put the patient into an extreme risk of rolling out of the bed. Additionally, the Swersey patent does not disclose or address the common problem of inconsistent or inaccurate measurements caused by a patient's position on the surface of the bed.

Therefore it is also desirable to have a totally portable weigh system that is stable and consistently accurate. Such a system should be adjustable to fit a plurality of objects that could hold a patient, and it must be capable of weighing relatively heavy patients. Such a system that does not require leveling and is relatively maintenance free and totally portable would be a significant advancement over the prior art.

BRIEF SUMMARY OF THE INVENTION

Accordingly it is an objective of the present invention to provide a load cell weighing system, particularly useful in the accurate and reproducible measurement of the weight of an occupant in a hospital or nursing home bed, that may be conveniently used with a plurality of such beds without permanently attaching the system to such beds.

It is another objective of this invention to provide such a weighing system that is stable while in use so as to minimize the potential for patient injury due to the bed tilting.

It is a further objective of this invention to provide such a system that gives a consistently accurate weight regardless of a patient's position on the surface of the bed.

Yet another objective of this invention is to provide such a system that is capable of weighing relatively heavy patients.

Another objective of this invention is to provide such a system that does not require leveling before use.

It is also an objective of this invention to provide such a system that requires relatively little maintenance, such as re-calibration.

Still another objective of this invention is to provide such a system that is relatively inexpensive, not time consuming for the caregivers, does not require two persons to operate it, and does not pose a risk or danger to either the patient or caregiver.

These and other such objectives as will become apparent from the disclosure below are met by the invention described herein.

A preferred embodiment of this invention includes two custom designed electronic load cell scales and one weight data collector. One custom designed electronic scale is placed under the two legs at the head of the bed and the other is placed under the two legs at the foot of the bed. Each of the scales comprise a beam shaped load cell with a stable floor engaging base, a support bar mounted above and attached to the load cell, and a pair of support bar extensions that are adjustably attached to the support bar so the scales can accommodate beds of different widths. The support bar extensions include a leg pad and a wheel cup to accommodate beds with different types of wheels or legs.

Weighing error is minimized by the use of electronic strain gauges that measure deflection in the beam shaped load cells. The electronic output of both load cells is conducted to a weight data collector where the total weight measured by the two load cells is calculated.

Due to the use of a deflectable beam shaped load cell, non-vertical, off center, or side directed force components can not introduce a weighing error into the system. As a result, the weighing system of this invention provides an accurate weight regardless of the patient's position in or on the bed.

The weighing system of this invention is advantageously designed to accommodate a maximum weight of up to 750 pounds. The scales of this invention will not tip or tilt if a patient shifts his or her weight to one side, or the other, of the bed. The scales of this invention do not require leveling and they have no moving parts. They are therefore relatively maintenance free and require no re-calibration.

The weighing system of this invention teaches the use of two portable scales, and a weight data collector. The scales of this invention are adjustable to accommodate beds of various widths having various types of wheels or legs. In use, the scales are adjusted to the proper width for the bed to be accommodated. The load cells are then connected by wire to the weight data collector, and the bed is placed on the scales, one scale at the head of the bed and one scale at the foot of the bed. The electronic strain gauges in the load cells then measure the deflection of the beam type load cell and transmit the data to the weight data collector. The weight data collector calculates the weight and displays it on a digital readout.

Bed jacking devices can be used to place the bed on the scales, however this is not required. The weight data collector can be readily programmed to automatically subtract the weight of the bed before displaying the patient's weight on the digital readout. The components of the scale are made of material sufficiently strong to support the weight of a patient up to 750 pounds plus the weight of the bed.

One example of an additional use for this system is in home health care. Often, people requiring some type of supervised health care prefer to remain in their homes. Sometimes, it is necessary to monitor the weight of a bed-ridden patient who is receiving such care in his or her home. Renting, transporting, and moving a bed with a weighing system permanently attached into a persons home could be expensive and difficult. To overcome these obstacles, the weigh system of this invention could be rented from a medical supply company, and placed under the patient's existing bed. The supervising health care professional can then monitor the patient's weight. When the scale is no longer needed, it simply can be returned to the medical supply company.

This invention provides a load cell weighing system, particularly useful in the accurate and reproducible measurement of weight of the occupant of hospital or nursing home beds. The weighing system of this invention may be conveniently used with a plurality of such beds without attaching the system to such beds. The scales of this invention are stable so as to minimize the potential for patient injury due to the bed tilting. The weighing system of this invention gives a consistently accurate weight regardless of a patient's position on the surface of the bed, and is also capable of providing extremely accurate weight measurements for the relatively heavy patients. The weighing system does not require leveling before use and requires relatively little maintenance, such as re-calibration.

BRIEF DESCRIPTION OF THE DRAWINGS

The several objectives and features of the present invention will become more readily apparent from the following detailed description taken in conjunction with the accompanying drawings in which:

FIG. 3 is an exploded view showing the components of the scales of this invention.

FIG. 4 is an end view of one corner of a bed showing a bed wheel in the wheel cup of the support bar extension.

FIG. 5 is a perspective view showing the support beam of this invention in its unassembled state.

FIG. 6 is a cross sectional view taken along line 6—6 of FIG. 5 showing the closed end of the support bar extension in greater detail.

DETAILED DESCRIPTION OF THE DRAWINGS

Figure 1:
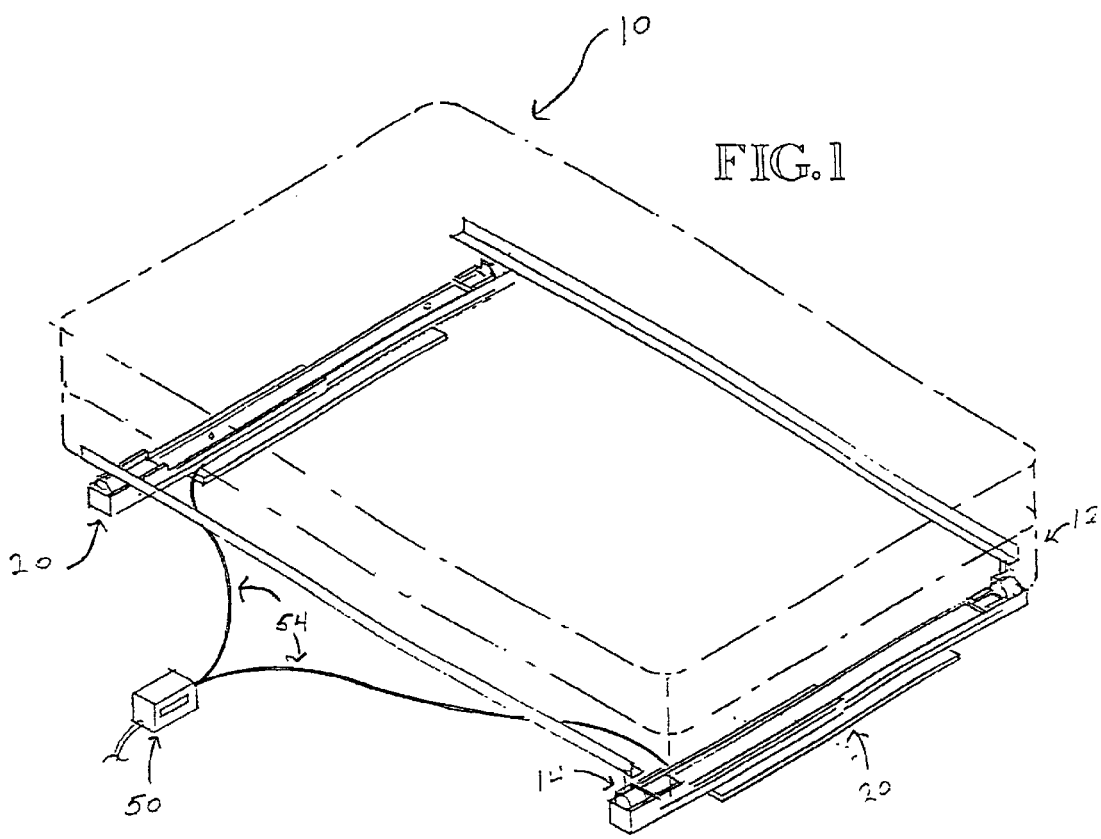
FIG. 1 is an elevated perspective view of the weighing system of this invention with a bed mounted thereon.

Referring specifically to the drawings, wherein like numerals indicate like parts, a preferred embodiment of this invention is shown in FIG. 1, a bed 10 having a mattress support 12 upon which a patient is supported. The bed 10 includes four legs 14 which are supported by scales 20 connected by cables 54 to weight data collector 50.

Figure 2:
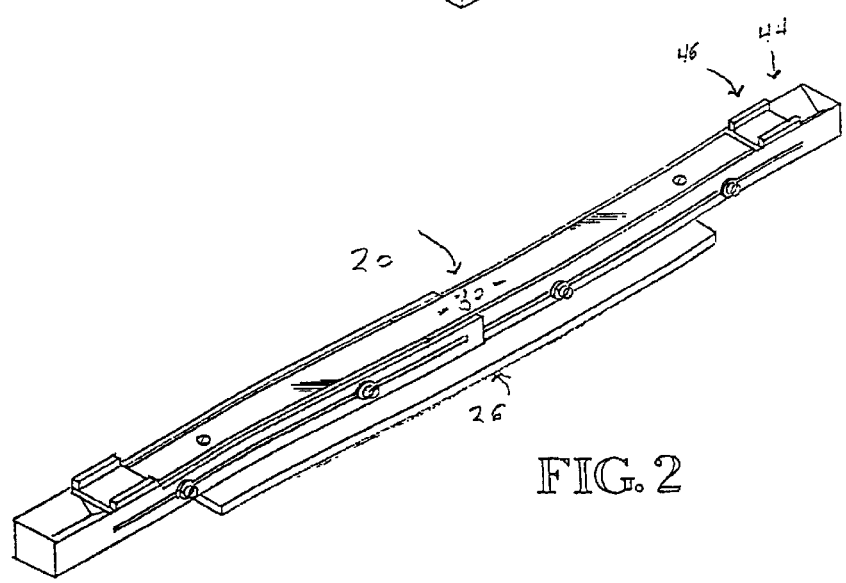
FIG. 2 is a perspective view showing one of the scales of this invention.

FIG. 2 and FIG. 3 show the components of the scales of this invention in more detail. Scale 20 is comprised of beam shaped load cell, support bar 30, and support bar extensions 48. The beam shaped load cell comprises deflectable beam portion 22 having an upper surface and two threaded holes 24 on the upper surface. The load cell 22 is shared such that a section of the load cell rests on a horizontally disposed floor engaging base 26 and the ends of the load cell are elevated above the base 26 such that the ends do not rest on the base. The load cell 22 has a plurality of holes 25 that communicate through the load cell and the base has a plurality of threaded holes corresponding to the holes through the load cell. The load cell is attached to the base by threaded fasteners that are placed into the holes through the load cell and threadedly engaged with the base. Strain transducers for measuring deflection of the beam portion 22 are located inside the beam portion 22, which is attachable to the weight data collector 50. The horizontally disposed floor engaging base 26 provides stability for the scale, and keeps the bed from tilting or tipping when a patient shifts his or her weight.

Support bar 30 is an elongated square bar positioned above the beam portion of the load cell. Fastener holes 34 communicate through support bar 30 and correspond to threaded holes 24 on the beam portion 22 of the load cell. The support bar 30 is fastened to the beam portion 22 of the load cell with threaded fasteners that are routed through the fastener holes 34 of the support bar 30 and threadedly engaged with the threaded holes 24 of the beam portion 22 of the load cell. Four adjustment holes 32 are spaced along each of the two sides of the support bar 30. The adjustment holes 32 are threaded and communicate into the support bar 30.

The scale 20 further includes two support bar extensions 40. The support bar extensions 40 are closed at one end, and the other end is adapted for attachment to the support bar 30. Wheel cup 44 and leg pad 46 are located on the closed end of the support bar extension 40 and they provide a location for placement of bed wheels, bed legs, or other structure used to support a bed. A pair of extension panels 48 extend from the closed end of the support bar extensions 40 and form the end adapted for attachment to the support bar 30. The extension panels 48 are separated by a space that is equal to the width of the support bar 30. Each of the extension panels 48 have a longitudinal slot communicating there through that extends from near the adapter end of the support bar extension 40 toward the closed end, and terminates under the leg pads 46.

whereby the support bar extensions 40 are adjustably attached to the support bar 30 by placing one of the extension panels 48 on each side of the support bar 30 with the leg pads 46 and the wheel cups 44 facing up. Adjustment fasteners 42 are passed through the longitudinal slots in the extension panels 48 and threadedly engaged with the adjustment holes 32 on the sides of the support bar 30.

FIG. 4 shows an end view of a bed 10 with mattress support 12 and legs 14 mounted on scale 20 by placing the wheels of the bed 10 in wheel cup 44. Scale 20 is securely supported by base 26, which provides sufficient stability to prevent the bed from tilting or tipping if a patient moves or shifts his or her weight.

FIG. 5 is an exploded perspective view of one corner of a bed mounted on one of the scales of this invention. The wheel on the end of leg 14 is securely placed in wheel cup 44. Support bar extension 40 is extended outward from the center of support bar 30 to accommodate the width of the bed. Adjustment of support bar extensions 40 is accomplished by loosening adjustment fasteners 42, that are routed through the longitudinal slot in extension panels 48, and sliding the support bar extension outward until the desired width is achieved before tightening adjustment fasteners 42.

FIG. 6 is a cross sectional view taken along line 6—6 of FIG. 5, which shows in detail the structure of wheel cup 44 and the closed end of the support bar extension 40. FIG. 6 also shows that the weight of the bed is above the beam portion 22 of the load cell, which is supported by base 26.

Figure 7:
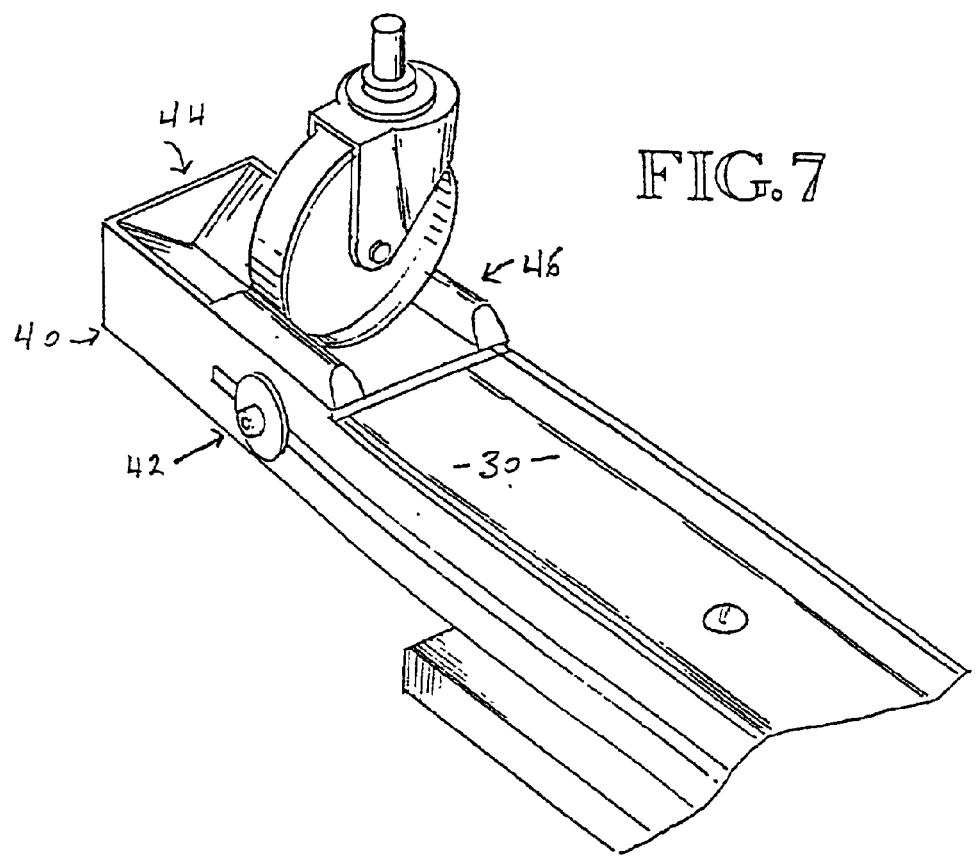
FIG. 7 is a perspective view showing a bed wheel resting on the leg pad of a support bar extension.

FIG. 7 shows an alternate method of mounting a bed on scale 20, by placing a wheel on pad 46. Support bar extension 40 is adjusted and moved inward toward the center of support bar 30 to accommodate the width of the bed.

Figure 8:
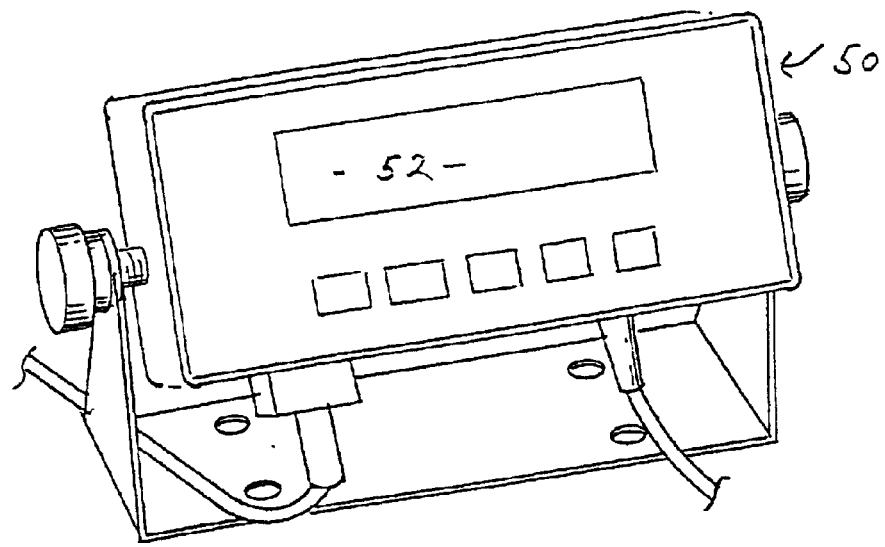
FIG. 8 is a perspective view of the front of the weight data collector of this invention.

FIG. 8 depicts the weight data collector 50 of the invention. Weight data collector 50 is connected to the beam portion of the load cell by cables 54. When a weight is placed on scales 20, beam portions 22 of the scales undergo deflection, which is measured by strain transducers. The data from both scales is then transmitted to weight data collector 50 where the weight is computed and displayed on the digital readout window 52.

Another example of the use of the current invention would be a hospital or long term care facility that was required to monitor the weight of bed-ridden patients. Rather than go to the undue expense of purchasing a large number of beds with weigh systems permanently attached, a smaller number of weigh systems of the current invention could be purchased. The weigh systems could then be adjusted to the width of the beds used in the facility and the scales could be placed under the beds as needed, either by using a bed jack or by hand, and removed once the patient has been weighed. Alternatively, the scales could be left under the bed if more frequent weight measurements were required.

This invention provides a load cell weighing system that can consistently provide an accurate measurement of weight of the occupant of hospital or nursing home beds. The weighing system of this invention is adaptable for use with a plurality of such beds and does not have to be permanently attached. The scales of this invention are stable so as to minimize the potential for patient injury due to the bed tilting and can therefore be left in place under the bed for a long period of time without worry. The weighing system of this invention gives a consistently accurate weight regardless of a patient's position on the bed, and is capable of weighing relatively heavy patients. The weighing system does not require leveling before use and requires relatively little maintenance, such as re-calibration. Facilities utilizing the weighing system of this invention can realize savings in equipment and maintenance costs, which can then be passed along to the patients.

Industrial Applicability

This invention is applicable to the measurement of weight of occupants in beds and more particularly to obtaining consistently accurate weights of those occupants regardless of their position in or on the bed. It is portable, and it can be quickly installed for use. The system does not need to be permanently attached to the bed, so it can be easily stored when not in use. The scales of this invention can be adapted to fit a variety of beds, they require very little maintenance, and they are stable while in use.

In compliance with the statute, the invention has been described in language more or less specific as to structural features. It is to be understood, however, that the invention is not limited to the specific features shown or described, since the means and construction shown or described comprise preferred forms of putting the invention into effect. Additionally, it will be readily apparent to those skilled in the art that the invention can be adapted for weighing patients in chairs and other items of furniture, and therefore the invention should not be construed as being limited to determining the weight of a patient who is confined to a bed. The invention is, therefore, claimed in any of its forms or modifications within the legitimate and valid scope of the appended claims, appropriately interpreted in accordance with the doctrine of equivalents.

I claim as my invention:

1. A weigh system for use on beds comprising:
   a pair of scales,
   each scale comprising, a horizontally disposed floor engaging base;
a load cell having a deflectable beam portion and means for measuring and transmitting deflection of said beam portion;
   said load cell being attached to said base by a plurality of threaded fasteners;
a support bar positioned above said load cell and attached to said load cell by a pair of threaded fasteners;
two support bar extensions adjustably attached to said support bar such that the width of said scale can be readily adjusted to accommodate beds of varying widths;
   each of said support bar extensions adapted for placing the support structure of a bed thereon;
a weight data collector attached to said load cell;
whereby one of said pair of scales is positioned under the head of a bed and the other of said pair of scales is positioned under the foot of said bed, said support bar extensions are adjusted so that the legs of the wheels of said bed rest on said support bar extensions, deflection of said beam portion of said load cells is measured by said means for measuring deflection of said beam portion, said deflection measurement is transmitted to said weight data collector; and
based on said deflection, said weight data collector calculates and displays the weight of said bed and any person therein.

2. The weigh system of claim 1 wherein said means for measuring and transmitting deflection of said beam portion is a strain transducer.

3. The weigh system of claim 1 wherein said weight data collector displays only the weight of any person in said bed.

4. The weigh system of claim 1 wherein said support bar extensions further comprise a leg pad, and a wheel cup; said leg pad adapted for placing the support structure of a bed thereon, and said wheel cup adapted for placing the support structure of a bed therein.

5. A weigh system for use on beds comprising:
a pair of scales,
each scale comprising,
   a horizontally disposed floor-engaging base;
   a load cell having a deflectable beam portion and strain transducers for measuring and transmitting the deflection of said beam portion;
   said beam portion having an upper surface, a lower surface, and a shape such that when said beam portion is placed on said horizontally disposed base, a section of said beam portion rests on said base and the ends of said beam portion are elevated such that they do not rest on said base;
   said beam portion having two threaded holes on said upper surface that communicate into said beam portion, said threaded holes being spaced such that one is near each end of said beam portion;
   said beam portion also having a plurality of holes that communicate through said beam portion from said upper surface to said lower surface of said section of said beam portion that rests on said base;
   said base having a plurality of threaded holes, communicating into said base, that correspond to said holes communicating through said beam portion;
   said beam portion being connected to said base by a plurality of threaded fasteners that are routed through said holes communicating through said beam portion and threadedly engaged with said base;
   a support bar positioned above said load cell, said support bar being longer than said beam portion of said load cell and having a top surface a bottom surface and two side surfaces;
   said support bar having two fastener holes communicating through said support bar from said top surface to said bottom surface, said fastener holes being positioned on said support bar such that they correspond to said threaded holes on said beam portion of said load cell;
   said support bar having four adjustment holes spaced along each of said two side surfaces, said adjustment holes being threaded and communicating into said support bar;
   said support bar being connected to said beam portion of said load cell with threaded fasteners that are routed through said fastener holes of said support bar and threadedly engaged with said threaded holes of said beam portion of said load cell;
two support bar extensions, each of said support bar extensions having a closed end, an adapter end, a leg pad, and a wheel cup;
   said leg pad being adapted for placing the support structure of a bed thereon and said wheel cup adapted for placing the support structure of a bed therein;
   said wheel cup positioned near said closed end of said support bar extension and said leg pad positioned to adjacent said wheel cup and opposite said closed end of said support bar extension;
   said support bar extension having a pair of extension panels extending from said closed end of said support bar extension and terminating at said adapter end, said extension panels separated by a space that is equal to the width of said support bar;
   each of said extension panels having a longitudinal slot communicating there through, said longitudinal slot extending from near said adapter end of said support bar extension toward said closed end of said support bar extension and terminating under said leg pads,
   said support bar extensions being adjustably connected to said support bar, by fasteners that are passed through said longitudinal slots in said extension panels and threadedly engaged with said adjustment holes on the sides of said support bar such that the width of said scale can be adjusted to accommodate beds of varying widths, by placing one of said extension panels, of each of said support bar extensions on each side of said support bar, with said leg pads and said wheel cups facing up and said support bar extension positioned such that said closed end of said support bar extension is positioned at the end of said support bar extension that is furthest away from said support bar;
a weight data collector attached to said load cells;
whereby one of said pair of scales is positioned under the head of a bed and the other of said pair of scales is positioned under the foot of said bed, said support bar extensions are adjusted so that the legs of said bed rest on said leg pads or so that the wheels of said bed rest in said wheel cups, said strain transducers measure and transmit the deflection in said beam portions of said load cells to said weight data collector; and
based on said deflection, said weight data collector calculates the weight of said bed and any person therein.

6. The weigh system of claim 5 wherein said weight data collector displays only the weight of any person in said bed.

7. The weigh system of claim 5 wherein the width of said scale is changed to accommodate beds of various widths by loosening said adjustment fasteners that are routed through said longitudinal slot communicating through said extension panels of said support bar extensions and sliding said support bar extensions toward or away from the center of said support bar until the desired width is achieved and then tightening said adjustment fasteners.

8. The weigh system of claim 1 wherein said beam portion has an upper surface, a lower surface, and a shape such that when said beam portion is placed on said horizontally disposed base, a section of said beam portion rests on said base and the ends of said beam portion are elevated such that they do not rest on said base.

9. The weigh system of claim 8 wherein said beam portion has a plurality of holes that communicate through said beam portion from said upper surface to said lower surface of said section of said beam portion that rests on said base;

said base has a plurality of threaded holes, communicating into said base, that correspond to said holes communicating through said beam portion; and said beam portion is connected to said base by a plurality of threaded fasteners that are routed through said holes communicating through said beam portion and threadedly engaged with said base.

10. The weigh system of claim 9 wherein said beam portion has two threaded holes on said upper surface that communicate into said beam portion, said threaded holes being spaced such that one hole communicates into the elevated section at each end of said beam portion;

said support bar has two fastener holes communicating through said support bar from said top surface to said bottom surface, said fastener holes being positioned on said support bar such that they correspond to said threaded holes on said beam portion of said load cell; and said support bar being connected to said beam portion of said load cell with threaded fasteners that are routed through said fastener holes of said support bar and threadedly engaged with said threaded holes of said beam portion of said load cell.

11. The weigh system of claim 10 wherein said support bar has four adjustment holes spaced along each of said two side surfaces, said adjustment holes being threaded and communicating into said support bar;

each of said support bar extensions has a closed end and an adapter end;

each of said support bar extension has a pair of extension panels extending from said closed end of said support bar extension and terminating at said adapter end, said extension panels separated by a space that is equal to the width of said support bar;

each of said extension panels has a longitudinal slot communicating there through, said longitudinal slot extending from near said adapter end of said support bar extension toward said closed end of said support bar extension and terminating near said closed end; and said support bar extensions are adjustably connected to said support bar, by fasteners that are passed through said longitudinal slots in said extension panels and threadedly engaged with said adjustment holes on the sides of said support bar, by placing one of said extension panels, of each of said support bar extensions on each side of said support bar such that said closed end of said support bar extension is positioned at the end of said support bar extension that is furthest away from said support bar.

* * * * *